US012718659B2

(12) United States Patent
Meyer et al.

(10) Patent No.: US 12,718,659 B2
(45) Date of Patent: Aug. 25, 2026

(54) TELEMATICS SYSTEM AND METHOD FOR MONITORING AND COORDINATING MANAGEMENT OF DISTRIBUTED GAMING MACHINES

(71) Applicant: Procon Analytics, LLC, Irvine, CA (US)

(72) Inventors: David Meyer, Knoxville, TN (US); William Essex Cheney, San Diego, CA (US)

( * ) Notice: Subject to any disclaimer, the term of this patent is extended or adjusted under 35 U.S.C. 154(b) by 193 days.

(21) Appl. No.: 18/895,064

(22) Filed: Sep. 24, 2024

(65) Prior Publication Data

US 2025/0104515 A1 Mar. 27, 2025

Related U.S. Application Data

(60) Provisional application No. 63/540,097, filed on Sep. 24, 2023.

(51) Int. Cl.
*G07F 17/32* (2006.01)

(52) U.S. Cl.
CPC ...... *G07F 17/3241* (2013.01); *G07F 17/3223* (2013.01); *G07F 17/3232* (2013.01); *G07F 17/3234* (2013.01)

(58) Field of Classification Search
CPC ............. G07F 17/3241; G07F 17/3223; G07F 17/3232; G07F 17/3234
USPC ............................................................ 463/29
See application file for complete search history.

(56) References Cited

U.S. PATENT DOCUMENTS

| | | | |
|---|---|---|---|
| 5,428,367 A | 6/1995 | Mikan | |
| 5,465,364 A | 11/1995 | Lathrop et al. | |
| 5,707,286 A | 1/1998 | Carlson | |
| 6,383,076 B1 | 5/2002 | Tiedeken | |
| 6,620,047 B1 | 9/2003 | Alcorn et al. | |
| 6,979,266 B2 | 12/2005 | Lemay et al. | |
| 7,351,147 B2 | 4/2008 | Stockdale et al. | |
| 7,515,718 B2 | 4/2009 | Nguyen et al. | |
| 7,591,413 B1 | 9/2009 | Block et al. | |
| 7,600,108 B2 | 10/2009 | Gentles | |
| 8,083,592 B2 * | 12/2011 | Wells ...................... | G07F 9/026 463/24 |

(Continued)

*Primary Examiner* — Allen Chan
(74) *Attorney, Agent, or Firm* — Patterson Intellectual Property Law, PC

(57) ABSTRACT

An anti-tampering system and/or method are provided for use with a virtual gaming machine network. Various distributed gaming machines reside in respective physical locations and have respective unique identifiers, each machine including: sensors which generate output signals corresponding to input power, current position, and/or current orientation thereof; cellular modems; and resident controllers which conditionally generate event based messages in real time responsive to events identified via the sensor outputs. A remote processor independently interfaces with each resident controller via the cellular modems to define a secure wireless network. In response to receiving an event based message comprising an identifier, the respective gaming machine is identified by retrieving an associated unique identifier from data storage, and an alert or response message is conditionally generated based on a comparison of the event based message and a stored operating state for the respective gaming machine.

20 Claims, 3 Drawing Sheets

(56) References Cited

U.S. PATENT DOCUMENTS

| | | | | |
|---|---|---|---|---|
| 8,231,463 | B2 | 7/2012 | Wells et al. | |
| 8,388,454 | B2 * | 3/2013 | Kido | G07F 17/32 463/46 |
| 8,543,837 | B2 * | 9/2013 | Bigelow, Jr. | G07F 17/3241 380/278 |
| 8,657,669 | B2 * | 2/2014 | Muir | G07F 17/32 714/39 |
| 8,696,449 | B2 | 4/2014 | Wells | |
| 9,005,034 | B2 | 4/2015 | Mcallister et al. | |
| 9,633,507 | B2 | 4/2017 | Wolf et al. | |
| 10,356,577 | B1 | 7/2019 | Kugler et al. | |
| 2007/0112907 | A1 | 5/2007 | Defosse | |
| 2008/0045342 | A1 | 2/2008 | Crowder et al. | |
| 2008/0064501 | A1 | 3/2008 | Patel | |
| 2009/0181764 | A1 | 7/2009 | Dasgupta | |
| 2009/0220078 | A1 | 9/2009 | Campbell | |
| 2010/0062844 | A1 | 3/2010 | Crowder et al. | |
| 2010/0120526 | A1 | 5/2010 | Singh | |
| 2010/0124983 | A1 | 5/2010 | Gowin et al. | |
| 2010/0265061 | A1 | 10/2010 | Harmon et al. | |
| 2018/0328078 | A1 * | 11/2018 | Lloreda | E05B 39/005 |
| 2020/0211322 | A1 | 7/2020 | Petersen et al. | |
| 2020/0226881 | A1 | 7/2020 | Warner et al. | |
| 2020/0364977 | A1 | 11/2020 | Reeves | |
| 2021/0248868 | A1 | 8/2021 | Mohrhardt et al. | |
| 2022/0122415 | A1 | 4/2022 | Petersen et al. | |

* cited by examiner

TELEMATICS SYSTEM AND METHOD FOR MONITORING AND COORDINATING MANAGEMENT OF DISTRIBUTED GAMING MACHINES

CROSS-REFERENCES TO RELATED APPLICATIONS

This application claims benefit of U.S. Provisional Patent Application No. 63/540,097, filed Sep. 24, 2023, and which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE DISCLOSURE

The present disclosure relates generally to the field of gaming machines in a distributed environment. More particularly, the disclosure relates to a telematics system enabling a secure network of gaming machines independent of their respective locations and with respect to a central host server, having data gathering, gaming machine control, reporting, anti-tampering, dynamic planning, and other related functions implemented in accordance therewith.

BACKGROUND

Casinos and other entertainment facilities often include large numbers of freestanding stationary gaming machines positioned throughout their facility. Of these gaming machines, electronic and microprocessor based gaming machines have experienced a significant growth in popularity. In use, a player may interact with these gaming machines by placing a wager to initiate a game. The gaming machine may then run the game, determine a game outcome, and selectively assign an award to the player based on the game outcome.

In other environments, stationary gaming machines may be distributed in smaller groups across a wide area, even for example as a stand-alone gaming machine. In such distributed environments, conventional security measures which are otherwise possible in a casino are understandably impractical. It is therefore not uncommon for such gaming machines to fall victim to nefarious acts, including theft and tampering.

Also in such distributed gaming environments, daily reporting (e.g., money in money out transaction reporting) or other desirable status monitoring activities are significantly more difficult than in a more tightly clustered casino (or equivalent) environment.

Personnel are assigned to travel to each gaming machine in a distributed environment, whether for routine servicing and maintenance, removal of funds from the machine, or the like. However, conventional systems and methods lack real-time feedback from the respective machines to enable informed route planning with respect to the machines, and in many cases personnel are obligated to physically attend to machines for which no such attention is yet required.

Systems and methods currently in existence may for example utilize the Slot Accounting System (SAS) protocol, which was created primarily to allow casino operators to remotely monitor and gather data on their gaming machines. It was intended for a single central accounting system to be able to request data from and provide instruction to individual machines in a multi-machine environment. The specification allows for physical interfaces to support the SAS protocol, which may include daisy chaining, i.e., connecting multiple gaming machines to a single host via fiber tap boards, or a SMart Interface Board (SMIB). The SMIB polls the gaming machine to which it is connected and passes the information for that gaming machine to the host.

However, conventional SAS-based solutions address the needs of gaming machine owners or operators that have many machines located in a single space. In this scenario it is easy to have the machines physically connected to the central accounting system via optical cable or wires. It is also easy to secure this network as it does not need to be accessible outside the physical location of the gaming machines. Unfortunately, this does not address the needs of owners or operators of gaming machines that are not co-located. Many such owners or operators have gaming machines in the hundreds and sometimes thousands spread across a large geographical area. In this environment, it is not possible to provide a physical connection back to the central accounting system.

BRIEF SUMMARY

It would be desirable to selectively incorporate aspects of telematics technology in the context of a broadly distributed gaming machine network and central accounting system, specifically relating to machines that are spread out across a large geographical area, at least for the purpose of enhanced reporting capabilities. In addition, a need exists for improvements in conventional anti-tampering systems for use with distributed stationary gaming machines, which in accordance with embodiments as disclosed herein may be provided through the implementation of telematics technology.

In an embodiment as disclosed herein, an anti-tampering system is provided for use with a virtual gaming machine network. A plurality of distributed gaming machines reside in respective physical locations and are associated with respective unique identifiers, each gaming machine including one or more sensors configured to generate output signals corresponding to one or more of an input power, current position and/or current orientation of the respective gaming machine, a cellular modem, and a resident controller configured to conditionally generate an event based message in real time responsive to an event identified at least in part based on the output signals from the one or more sensors. A remote processor is associated with data storage and configured to: independently interface with each resident controller via the respective cellular modem to define a secure wireless network comprising the plurality of distributed gaming machines; store in data storage for each of the plurality of distributed gaming machines an operating state and the respective unique identifier; and in response to receiving an event based message comprising an identifier, to identify the respective gaming machine by retrieving the associated unique identifier from the data storage, and conditionally generate an alert or response message based at least in part on a comparison of the event based message and the stored operating state for the respective gaming machine In one exemplary aspect in accordance with the above-referenced system embodiment, each resident controller may be configured to generate an operating characteristic based signal responsive to one or more identified operating characteristics.

In another exemplary aspect in accordance with the above-referenced system embodiment, each resident controller may be configured to store data related to the one or more identified operating characteristics and generate the operating characteristic based signal periodically.

In another exemplary aspect in accordance with the above-referenced system embodiment, one of the one or more identified operating characteristics may correspond to the reception or distribution of money.

In another exemplary aspect in accordance with the above-referenced system embodiment, the remote processor may be configured to generate and transmit an identification request to a respective one of the plurality of gaming machines. The identification request may correspond to a request for the gaming machine to provide the associated unique identifier.

In another exemplary aspect in accordance with the above-referenced system embodiment, the remote processor may be configured to compare the unique identifier received from the respective one of the plurality of gaming machines to the stored unique identifier on the remote processor, and to generate an alert if the unique identifier received from the gaming machine does not match the stored unique identifier.

In another exemplary aspect in accordance with the above-referenced system embodiment, the identified event may correspond to an inclination of the gaming machine relative to gravity in excess of a set value.

In another exemplary aspect in accordance with the above-referenced system embodiment, the one or more sensors may include a gyroscope.

In another exemplary aspect in accordance with the above-referenced system embodiment, the identified event may correspond to movement of the gaming machine in excess of a set value.

In another exemplary aspect in accordance with the above-referenced system embodiment, the one or more sensors may include a global positioning system (GPS).

In another exemplary aspect in accordance with the above-referenced system embodiment, the identified event may correspond to a loss of power to the gaming machine.

In another exemplary aspect in accordance with the above-referenced system embodiment, the remote processor may be configured to predict an event based signal from a respective one of the resident controllers when an authorized party interacts with the gaming machine and to temporarily disable the generation of event based signals from the resident controller.

In another embodiment, a method is disclosed for monitoring a distributed gaming machine network, wherein the method comprises: virtually defining a secure wireless network comprising a remote processor independently linked with each of a plurality of gaming machines residing in respective physical locations and associated with respective unique identifiers, each gaming machine including a cellular modem functionally linked to the wireless network; at each of the plurality of gaming machines, generating output signals corresponding to one or more of an input power, current position and/or current orientation of the respective gaming machine, and further generating event based messages in real time responsive to an event identified at least in part based on the output signals; and in response to receiving an event based message comprising an identifier at the remote processor, identifying the respective gaming machine by retrieving the associated unique identifier from data storage, and conditionally generating an alert or response message based at least in part on a comparison of the event based message and a stored operating state for the respective gaming machine.

In one exemplary aspect according to the above-referenced method embodiment, an operating characteristic based signal may be generated responsive to one or more identified operating characteristics of the gaming machine via the one or more sensors and resident controller of a respective gaming machine.

In another exemplary aspect according to the above-referenced method embodiment, data related to the one or more identified operating characteristics may be stored on each resident controller, and the operating characteristic based signal periodically generated via the resident controller.

In another exemplary aspect according to the above-referenced method embodiment, one of the one or more identified operating characteristics may correspond to the reception or distribution of money.

In another exemplary aspect according to the above-referenced method embodiment, an identification request may be generated and transmitted to a respective one of the plurality of gaming machines, the identification request corresponding to a request for the gaming machine to provide an associated unique identifier, and the unique identifier received from the gaming machine may be compared to a stored unique identifier of the remote processor, wherein an alert may be generated via the remote processor if the unique identifier received does not match the stored unique identifier.

In another exemplary aspect according to the above-referenced method embodiment, the identified event may correspond to an inclination of the gaming machine relative to gravity in excess of a set value, and/or movement of the gaming machine in excess of a set value, and/or to a loss of power to the gaming machine.

Additional or alternative optional embodiments and aspects of a system and method as disclosed herein may relate to downstream implementation of telematics-based inputs from the respective gaming machines, for example at a hosted server network having responsibility for each of a plurality of distributed gaming machines. The machines provide real-time and/or programmatic signals via a communication network, for example a secured network having one or more dedicated interfaces between the hosted server and respective machines, wherein the hosted server is configured to perform one or more gaming network coordination features.

In one aspect, a gaming machine service route may be dynamically generated for a user based at least in part on the telematic inputs from the plurality of gaming machines. The service route may be generated to only include gaming machines having reported specified types of events, an accumulated amount of money over a threshold value, a rate of money accumulation in excess of a specified expected or target rate, or the like.

In another aspect, an initial gaming machine service route for a user may be modified in substantially real time based on a current location of the user along the initial service route and further in view of updated states for one or more respective gaming machines in the distributed network. An updated state may for example correspond to reported events of specified types, an accumulated amount of money over a threshold value, a rate of money accumulation in excess of a specified expected or target rate, or the like. For example, the hosted server may be configured to prioritize servicing or other functions for gaming machines with respect to a hierarchical state analysis and further in view of a relative priority, proximity, capability, and the like as applied at least to the user.

In another aspect, respective initial gaming machine service routes for each of a plurality of users may be modified in substantially real time based on current locations of the various users along their respective initial service routes and further in view of updated states for one or more respective gaming machines in the distributed network. An updated state may for example correspond to reported events of specified types, an accumulated amount of money over a threshold value, a rate of money accumulation in excess of a specified expected or target rate, or the like. For example, the hosted server may be configured to prioritize servicing or other functions for gaming machines with respect to a hierarchical state analysis and further in view of relative priorities, proximities, capabilities, and the like as applied at least to each of the respective users.

In another aspect, respective gaming machine service routes for each of one or more users may be monitored in real time, at least in view of current locations and expected arrivals at respective gaming machines along the service routes. Certain event monitoring functions associated with a respective gaming machine may for example be selectively disabled via signals from the remote server, such that event-based alerts or the like are not falsely generated from the gaming machines based on expected maintenance functions, and then enabled after a period of time or selectively enabled based on an input corresponding to a change in position of the associated user, e.g., indicating that the user has left the location of the respective gaming machine.

In some of the above-referenced embodiments and optional aspects thereof, features of the SAS protocol as otherwise previously known in the art may be combined with a secure wireless network to transmit the data back and forth between respective gaming machines in a broadly distributed network environment and a central processing unit, such as for example a hosted server system. As previously noted, conventional utilization of the SAS protocol provides the ability to monitor and control gaming machines from a central device if each of the gaming machines in the network is located within close proximity. Embodiments of a system and method according to the present disclosure may for example extend these capabilities to situations where the distances between respective gaming machines as well as with respect to the central host are too far for physical connections.

Numerous objects, features and advantages of the present invention will be readily apparent to those skilled in the art upon a review of the following description in conjunction with the accompanying drawings.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

Figure 1:
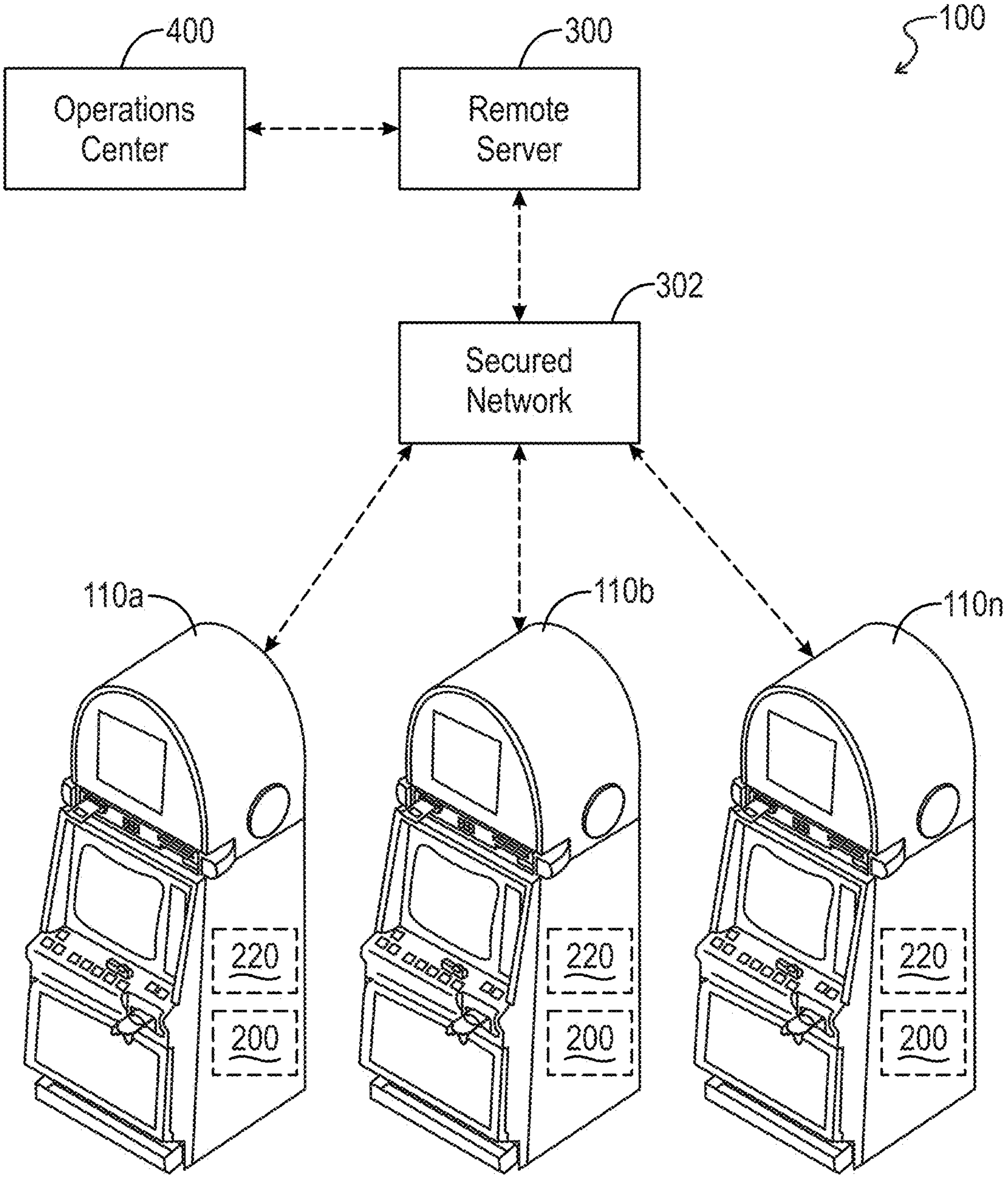
FIG. 1 is a schematic diagram of an anti-tampering system of the present disclosure.

Referring now to the figures, and particularly to FIG. 1, telematics devices may be provided for reporting data associated with each of a plurality of distributed stationary gaming machines 110*a*, 110*b*, . . . , 110*n* which may be located across a wide area but otherwise connected via a gaming machine network. As referenced herein, a "distributed" gaming environment may refer to individual gaming machines which are not coupled to each other or to a central controller via wired communications media, and further are frequently not within the same field of view of any one human observer, cameras, or other sensor. Examples of such a distributed gaming environment may include a plurality of machines, or a plurality of sub-groups of one or more machines in each sub-group, which are located in respective client facilities and only communicatively linked to a hosted server via a dedicated network for wireless transmissions. The term "stationary" is used herein to reference a gaming machine that is intended to be fixed in place during operation, or once positioned in a desired operating area, as to be distinguished from mobile gaming machines which may typically be utilized in different areas or even while traveling from place to place.

In an embodiment, the telematics devices and particularly the data generated thereby may be utilized in the context of an anti-tampering system as shown and generally designated by the number 100. In certain optional embodiments, the anti-tampering system 100 may be configured for use with each of the plurality of distributed gaming machines 110*a*, 110*b*, . . . , 110*n*. In other optional embodiments, the anti-tampering system 100 may be configured for use with a plurality of gaming machines 110*a*, 110*b*, . . . , 110*n* that are unrelated and not otherwise connected. Each of the plurality of gaming machines 110*a*, 110*b*, . . . , 110*n* may be referred to individually herein as simply a gaming machine 110.

A gaming machine network according to the present disclosure may include a plurality of gaming machines 110*a*, 110*b*, . . . , 110*n* and a central server or central hub. The central server may be configured, via for example the telematics devices, to receive, process, store, and transmit data related to the plurality of gaming machines 110*a*, 110*b*, . . . , 110*n*, such as game performance and game usage data. The plurality of gaming machines 110*a*, 110*b*, . . . , 110*n* and central server may be connected via a virtual connection that enables data sharing between the plurality of gaming machines 110*a*, 110*b*, . . . , 110*n* and the central server. The plurality of gaming machines 110*a*, 110*b*, . . . , 110*n* and central server may establish, or form, a network when the plurality of gaming machines 110*a*, 110*b*, . . . , 110*n* are communicatively coupled to, and in association with, one another and the central server. The anti-tampering system 100 may be integrated into or left separate from the conventional gaming machine network.

Each gaming machine 110 may be a mechanical slot machine, video slot machine, video poker machine, video blackjack machine, or the like without limitation on the scope of a gaming system or method as further discussed herein, unless otherwise specifically stated. For example, each gaming machine 110 may be mechanically based or electronic and microprocessor based, etc. One of skill in the art will appreciate that it is within the spirit and scope of the present disclosure for any gaming machine to be used in connection with the anti-tampering system 100.

Figure 2:
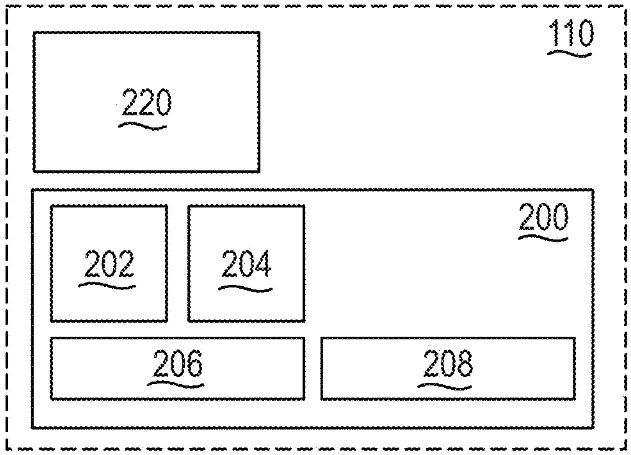
FIG. 2 is a block diagram of a resident controller associated with a gaming machine of the anti-tampering system of FIG. 1 in accordance with the present disclosure.

Each gaming machine 110 may include a resident controller 200. One exemplary resident controller 200 is schematically illustrated in FIG. 2. The resident controller 200 may be part of a machine control system of the gaming machine 110, or it may be a separate control module. Thus, the anti-tampering system 100 may utilize a factory-installed controller of the gaming machine 110 associated with gameplay, or an entirely separate controller.

The resident controller 200 may include or be associated with a processor 202, a computer-readable medium 204, a communication unit 206, and data storage 208 such as for example a database network. It is understood that the resident controller 200 described herein may be a single controller having some or all of the described functionality, or it may include multiple controllers wherein some or all of the described functionality is distributed among the multiple controllers.

Various operations, steps or algorithms as described in connection with the resident controller 200 can be embodied directly in hardware, in a computer program product such as a software module executed by the processor 202, or in a combination of the two. The computer program product can reside in RAM memory, flash memory, ROM memory, EPROM memory, EEPROM memory, registers, hard disk, a removable disk, or any other form of computer-readable medium 204 known in the art. An exemplary computer-readable medium 204 can be coupled to the processor 202 such that the processor 202 can read information from, and write information to, the memory/storage medium 204. In the alternative, the medium 204 can be integral to the processor 202. The processor 202 and the medium 204 can reside in an application specific integrated circuit (ASIC). The ASIC can reside in a user terminal. In the alternative, the processor 202 and the medium 204 can reside as discrete components in a user terminal.

The term "processor" 202 as used herein may refer to at least general-purpose or specific-purpose processing devices and/or logic as may be understood by one of skill in the art, including but not limited to a microprocessor, a microcontroller, a state machine, and the like. A processor 202 can also be implemented as a combination of computing devices, e.g., a combination of a DSP and a microprocessor, a plurality of microprocessors, one or more microprocessors in conjunction with a DSP core, or any other such configuration.

The communication unit 206 may support or provide communications between the resident controller 200 and external communications units, systems, or devices, and/or support or provide communication interface with respect to components of the anti-tampering system 100. The communication unit 206 may include wireless communication system components (e.g., via cellular modem, WiFi, Bluetooth or the like) and/or may include one or more wired communications terminals such as universal serial bus ports.

The data storage 208 may, unless otherwise stated, generally encompass hardware such as volatile or non-volatile storage devices, drives, electronic memory, and optical or other storage media, as well as in certain embodiments one or more databases residing thereon. In an optional embodiment, the data storage 208 may be configured to receive and retrievably store data sets, models, and/or algorithms, for further performing programmatic operations or the like as further disclosed herein.

Figure 3:
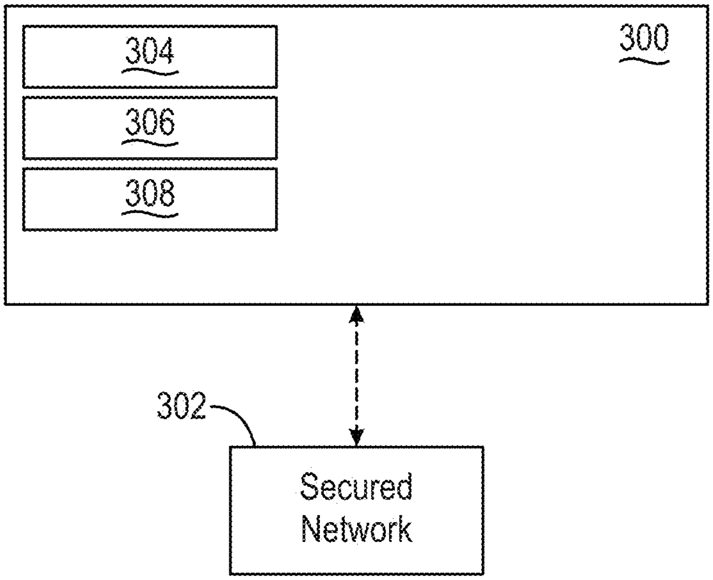
FIG. 3 is a block diagram of a remote processor of the anti-tampering system of FIG. 1 in accordance with the present disclosure.

The anti-tampering system 100 may include a remote processor 300. One exemplary remote processor 300 is schematically illustrated in FIG. 3. The remote processor 300 may be capable of selectively interfacing with each resident controller 200 of the plurality of gaming machines 110*a*, 110*b*, . . . , 100*n* via a secured network 302. The remote processor 300 may be associated with a server, a centralized host, or the like, and be capable of providing and/or maintaining the secured network 302 for the one or more sensors 220 and resident controllers 200 of the plurality of gaming machines 110*a*, 110*b*, . . . , 100*n*. The remote processor 300 may be located physically apart from the plurality of gaming machines 110*a*, 110*b*, . . . , 100*n* and thus be wirelessly connected to the resident controllers 200 of the plurality of gaming machines 110*a*, 110*b*, . . . , 100*n*. In certain optional embodiments, the plurality of gaming machines 110*a*, 110*b*, . . . , 100*n* may be distributed between several separate facilities, but all communicatively connected to the remote processor 300 via the secured network 302.

The remote processor 300 may be associated with a computer-readable medium 304, a communication unit 306, and data storage 308 such as for example a database network. The remote processor 300, computer-readable medium 304, communication unit 306, and data storage 308 may be separate and distinct from the processor 202, computer-readable medium 204, communication unit 206, and data storage 208 associated with each resident controller 200 of the plurality of gaming machines 110*a*, 110*b*, . . . , 100*n*.

Various operations, steps or algorithms as described in connection with the remote processor 300 can be embodied directly in hardware, in a computer program product, or in a combination of the two. The computer program product can reside in RAM memory, flash memory, ROM memory, EPROM memory, EEPROM memory, registers, hard disk, a removable disk, or any other form of computer-readable medium 304 known in the art. An exemplary computer-readable medium 304 can be coupled to the remote processor 300 such that the remote processor 300 can read information from, and write information to, the memory/storage medium 304. In the alternative, the medium 304 can be integral to the remote processor 300. The remote processor 300 and the medium 304 can reside in an application specific integrated circuit (ASIC). The ASIC can reside in a user terminal. In the alternative, the remote processor 300 and the medium 304 can reside as discrete components in a user terminal.

The remote processor 300 can also be implemented as a combination of computing devices, e.g., a combination of a DSP and a microprocessor, a plurality of microprocessors, one or more microprocessors in conjunction with a DSP core, or any other such configuration. A combination of computing devices in this context may comprise a host server network or equivalent grouping of computing devices to collectively, sequentially, or otherwise perform functions as disclosed herein with respect to each gaming machine in the secure environment.

The communication unit 306 may support or provide communications between the remote processor 300 and external communications units, systems, or devices, and/or support or provide communication interface with respect to components of the anti-tampering system 100. The communication unit 306 may include wireless communication system components (e.g., via cellular modem, WiFi, Bluetooth or the like) and/or may include one or more wired communications terminals such as universal serial bus ports.

The data storage 308 as further described below may, unless otherwise stated, generally encompass hardware such as volatile or non-volatile storage devices, drives, electronic memory, and optical or other storage media, as well as in certain embodiments one or more databases residing thereon. The remote processor 300 may store data associated with specific gaming machines 110 of the anti-tampering system 100. The stored data may correspond to a unique identifier associated with each of the plurality of gaming machines 110*a*, 110*b*, . . . , 100*n*. The unique identifier may include a numerical code or name that corresponds to a specific gaming machine 110. Moreover, the stored data may correspond to a stored physical machine location of the gaming machine 110. The stored physical machine location may be in the form of latitudinal and longitudinal coordinates readable by GPS technology.

In an embodiment within the scope of the present disclosure, features of the SAS protocol, or an equivalent, may be combined with a secure wireless network to transmit data between independent and broadly distributed gaming machines and a central computing device or associated group thereof, for example in a cloud computing environment. A microcontroller for each respective gaming machine may in this context gather data and events from the gaming machine using the SAS protocol, process them and send them to a central accounting system in the cloud via a secure cellular network. In this way, a virtual network may be defined of gaming machines that are not co-located, but nonetheless each connected to a central accounting system.

One of skill in the art may appreciate that the SAS protocol requires strict bit timing and regular messaging to operate. Because of the delays inherent in a cellular network and the data transmission costs associated with regular messaging, relevant embodiments of a system and method as disclosed herein may embed the functionality of a SAS central host controller on to the resident controller (e.g., microcontroller) for each gaming machine in the network. In this way, each gaming machine and interface consists of a single SAS client and SAS server.

Each of the plurality of gaming machines 110*a*, 110*b*, . . . , 110*n* may further include one or more sensors 220. The one or more sensors 220 may be event based sensors and/or time based sensors. Event based sensors may be operable to detect specific events associated with a respective gaming machine 110. Event based sensors may only operate when an event is detected, thus conserving energy as compared to other types of sensors. Time based sensors may be operable to detect operating characteristics of a respective gaming machine 110 throughout a period of time. Thus, time based sensors may require more energy than event based sensors as they operate for extended periods of time, rather than in response to specific events.

The one or more sensors 220 and resident controller 200 may be configured to generate an event based signal in real time responsive to an identified event associated with a respective gaming machine 110. The remote processor 300 may be configured to receive the event based signals generated by the plurality of gaming machines 110*a*, 110*b*, . . . , 110*n*. The one or more sensors 220 and resident controller 200 may automatically generate the event based signal upon detection of the event, rather than storing and/or analyzing the data associated with the event.

The one or more sensors 220 and resident controller 200 may also be configured to generate an operating characteristic based signal responsive to one or more identified operating characteristics of the gaming machine 110. Each resident controller 200 may be configured to store data related to the one or more identified operating characteristics for a set period of time. The resident controller 200 may then generate the operating characteristic based signal periodically. For example, in an exemplary optional embodiment, the resident controller 200 may store the data related to the one or more identified operating characteristics and generate the operating characteristic based signal every twelve (12) hours. While this is but one optional embodiment, a party in control of the anti-tampering system 100, such as hosted operations center personnel, may adjust the resident controller 200 to periodically generate the operating characteristic based signal in any desired frequency. The remote processor 300 may be configured to receive the operating characteristic based signals generated by the plurality of gaming machines 110*a*, 110*b*, . . . , 110*n*.

The remote processor 300 may be configured to selectively generate an alert or response message in response to receiving an event based signal or operating characteristic based signal from any one of the resident controllers 200 of the plurality of gaming machines 110*a*, 110*b*, . . . 110*n*. The remote processor 300 may analyze the signals received to determine whether to generate an alert, generate a response message, or not generate any alert or response message.

In certain optional embodiments, the alerts may be received by a hosted operations center 400. The hosted operations center may be configured to monitor and respond to alerts from the anti-tampering system 100, among other things. The hosted operations center 400 may monitor a single anti-tapering system 100 or a plurality of anti-tampering systems 100. For example, in one optional embodiment, a single hosted operations center 400 may monitor and respond to a plurality of anti-tampering systems 100 each associated with a separate client entity (e.g., retail stores) having distributed gaming machines located in association therewith. In other optional embodiments, a client entity may have its own operations center 400 responsible for monitoring a single anti-tampering system 100 associated with the client entity. The operations center 400 may be manned by human operators that provide operator input in response to the alerts. Alternatively, the operations center 400 may be a server or the like programmed to automatically respond to the alerts.

In one optional embodiment, the one or more sensors 220 may be operable to detect an inclination of the gaming machine 110 relative to gravity. The identified event of the gaming machine 110 may correspond to an inclination of the gaming machine 110 relative to gravity in excess of a set value. Setting a threshold value may prevent the one or more sensors 220 from detecting a minor event that is not worth reporting, such as when the gaming machine 110 is slightly tilted by a player leaning against it during the normal course of playing a game.

In this optional embodiment, the one or more sensors 220 may include a gyroscope to name one example. A person may tip or tilt the gaming machine 110 in an attempt to influence the outcome of a game played on the gaming machine 110. Thus, it may be advantageous to be alerted when the gaming machine 110 is tilted beyond a set threshold value. Upon receiving the event based signal from the resident controller 200 of the gaming machine 110, the remote processor 300 may generate an alert corresponding to the inclination of the gaming machine 110 relative to gravity exceeding the set value. The operations center 400 may, among other actions, disable the gaming machine 110 in response to the alert.

In one optional embodiment, the one or more sensors 220 may be operable to detect a physical machine location of the gaming machine 110. The identified event of the gaming machine 110 may correspond to movement of the gaming machine 110 in excess of a set value. Setting a threshold value may prevent the one or more sensors 220 from detecting a minor event that is not worth reporting, such as when the gaming machine 110 is moved a negligible amount by a player leaning against it during the normal course of playing a game or a person bumping the gaming machine 110 passing by.

In this optional embodiment, the one or more sensors 220 may include a global positioning system (GPS). Movement of the gaming machine 110 may be associated with an attempt to influence the outcome of a game played on the gaming machine 110 or with an attempt to abscond with the gaming machine 110 altogether. The one or more sensors 220 may detect physical movement of the gaming machine 110 and the resident controller 200 may generate the event based signal responsive to the detected physical movement. Upon receiving the event based signal from the resident controller 200 of the gaming machine 110, the remote processor 300 may compare the detected physical movement relative to the stored physical machine location the remote processor 300 associated with that specific gaming machine 110. The remote processor 300 may then generate an alert corresponding to the movement of the gaming machine 110 exceeding the set value. The operations center 400 may, among other actions, disable the gaming machine 110 in response to the alert.

In one optional embodiment, the one or more sensors 220 may be operable to detect an amount of power supplied to the gaming machine 110. In other optional embodiments, the one or more sensors 220 may simply be operable to detect whether or not power is supplied to the gaming machine 110. The identified event of the gaming machine 110 may correspond to a loss of power to the gaming machine 110, or the amount of power supplied to the gaming machine 110 falling below a threshold value. In this optional embodiment, the one or more sensors 220 may include a current detection sensor, a voltage detection sensor, or the like. Loss of power may be associated with an attempt to influence the outcome of a game played on the gaming machine 110 or with an attempt to abscond with the gaming machine 110 altogether. Upon receiving the event based signal from the resident controller 200 of the gaming machine 110, the remote processor 300 may generate an alert corresponding to the loss of power to the gaming machine 110.

In one optional embodiment, the one or more sensors 220 may be operable to detect money received by the gaming machine 110 and money distributed by the gaming machine 110. The one or more identified operating characteristics may correspond to the reception and distribution of money by the gaming machine 110. One advantage of this embodiment may be that the amount of money held within the gaming machine 110 may be tracked and monitored periodically. The host may then be able to determine whether money needs to be removed from the gaming machine 110 if the machine is nearing capacity or whether money needs to be added to the gaming machine 110 if the machine is nearing empty. In other optional embodiments, the one or more identified operating characteristics may correspond to an amount of unique interactions occurring with the gaming machine 110, an operating system status, and/or other operating characteristics that may be associated with the gaming machine 110.

In one optional embodiment, the remote processor 300 may be configured to generate and transmit an identification request to a respective one of the plurality of gaming machines 110*a*, 110*b*, . . . , 110*n*. The identification request may correspond to a request for the gaming machine 110 to provide the unique identifier associated with that specific gaming machine 110. This unique identifier may include a numerical code or name that corresponds to a specific gaming machine 110. The identification request may also correspond to a request for the gaming machine 110 to identify its physical machine location. The remote processor 300 may compare the unique identifier and/or physical machine location provided by the gaming machine 110 to the unique identifier and/or physical machine location stored on the remote processor 300. If the unique identifier does not match or the physical machine location has changed, the remote processor 300 may generate an alert.

The remote processor 300 may be configured to generate and transmit the identification request in response to an event. Alternatively, the remote processor 300 may be configured to generate and transmit the identification request periodically. One advantage of periodic generation and transmission of the identification request may be detection of security breaches that may otherwise avoid detection because the breach does not constitute an event detectable by the one or more sensors 220.

The remote processor 300 may be configured to predict receiving an event based signal from the resident controller 200 of a respective one of the plurality of gaming machines 110*a*, 110*b*, . . . , 110*n*. The operations center 400 may generate and transmit a message to the remote processor 300 indicating an authorized party intends to interact with one of the plurality of gaming machines 110*a*, 110*b*, . . . , 110*n*. Thus, the remote processor 300 may predict an event based signal to be transmitted from the specific one of the of the plurality of gaming machines 110*a*, 110*b*, . . . , 110*n*. In other optional embodiments, the authorized party may interact with each gaming machine 110 periodically according to a schedule, such as a host periodically retrieving money from a gaming machine 110. In this case, the remote processor 300 may predict an event based signal to be transmitted from the specific one of the of the plurality of gaming machines

110*a*, 110*b*, 110*n* based on the schedule. The remote processor 300 may temporarily disable the generation of event based signals from the resident controller 200 of the affected gaming machine 110. Alternatively, the remote processor 300 may simply ignore the event based signals being generated by the resident controller 200 of the affected gaming machine 110.

Figure 4:
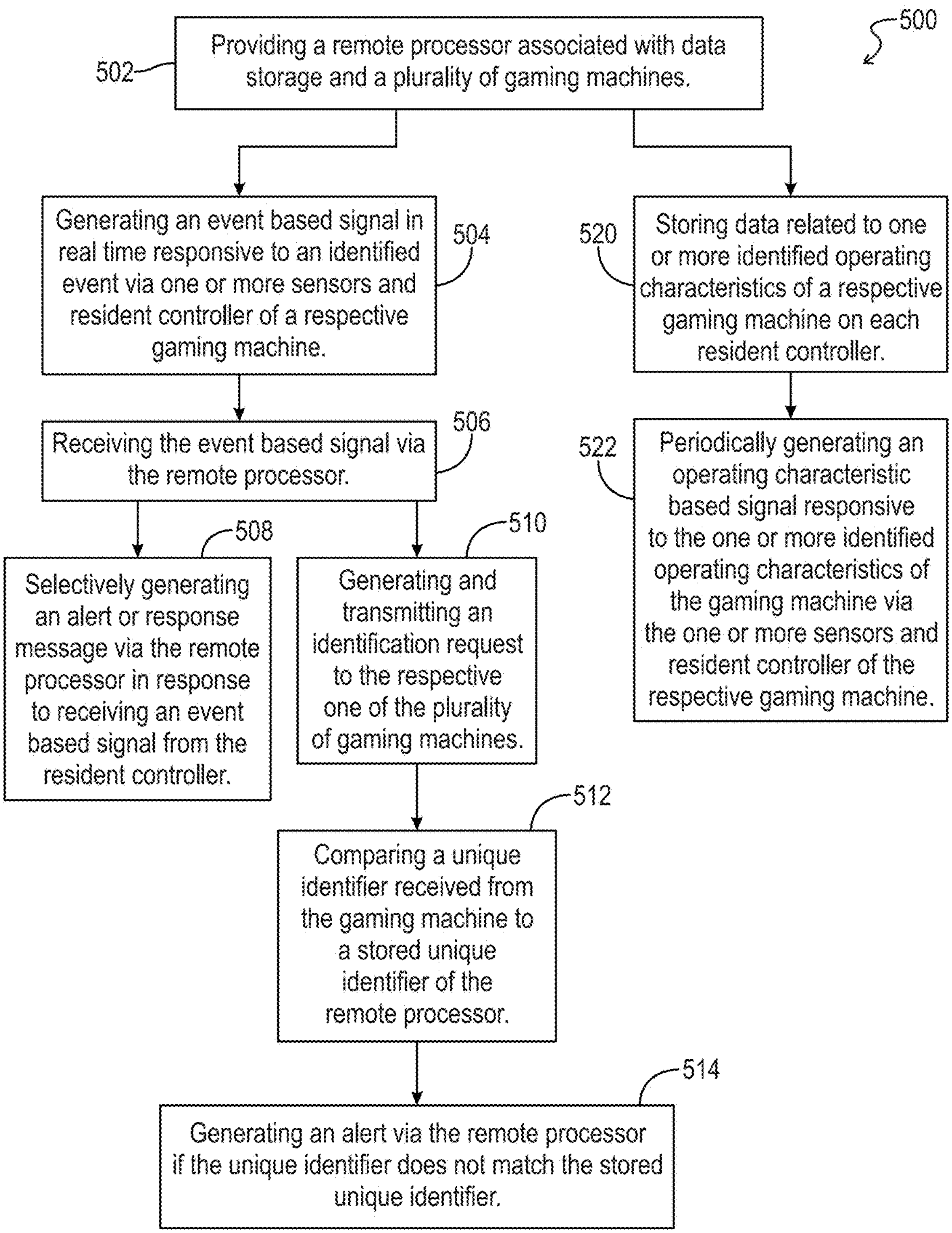
FIG. 4 is a block diagram of a method of monitoring a gaming machine network in accordance with the present disclosure.

Referring now to FIG. 4, an exemplary and non-limiting embodiment of a method 500 may be described for monitoring a gaming machine network.

The illustrated embodiment of method 500 begins by providing (step 502) the remote processor 300 associated with data storage 308 and the plurality of gaming machines 110*a*, 110*b*, . . . , 110*n*. Each gaming machine 110 may include one or more sensors 220 and resident controller 200. The remote processor 300 may be capable of interfacing with each resident controller 200 via the secured network 302.

In step 504, an event based signal may be generated in real time via the one or more sensors 220 and resident controller 200 of a respective gaming machine 110 responsive to an identified event. As previously mentioned, the identified event could correspond to an inclination of the gaming machine 110 relative to gravity in excess of a set value, movement of the gaming machine 110 in excess of a set value, loss of power to the gaming machine 110, and/or other events that may be associated with the gaming machine 110.

In step 506, the remote processor 300 may receive the event based signal from the one or more sensors 220 and resident controller 200 of the respective gaming machine 110.

In step 508, the remote processor 300 may selectively generate an alert or response message in response to receiving an event based signal and/or operating characteristics based signal from the resident controller 200 of a specific gaming machine 110. In one optional embodiment, the remote processor 300 may transmit the alert to the operations center 400. The operations center 400 may disable the gaming machine 110 in question or take other action.

In step 510, the remote processor 300 may generate and transmit an identification request to a respective one of the plurality of gaming machines 110*a*, 110*b*, . . . , 110*n*. The identification request may correspond to a request for the gaming machine 110 to provide an associated unique identifier and/or a physical machine location.

In step 512, the remote processor 300 may compare the unique identifier and/or physical machine location from the gaming machine 110 to a stored unique identifier of the remote processor 300. The remote processor may analyze whether the unique identifiers match and/or whether the physical machine location has changed in excess of a set value.

In step 514, the remote processor 300 may generate an alert if the unique identifier received from the gaming machine 110 does not match the stored unique identifier. Alternatively, the remote processor 300 may generate an alert if the physical machine location has changed in excess of a set value.

In step 520, each resident controller 200 of the plurality of gaming machines 110*a*, 110*b*, 110*n* may store data related to the one or more operating characteristics on the resident controller 200 and periodically generate the operating characteristics based signals via the resident controller 200.

In step 522, an operating characteristic based signal may be periodically generated responsive to the one or more identified operating characteristics via the one or more sensors 220 and resident controller 200 of a respective gaming machine 110. The one or more identified operating characteristics may correspond to the reception or distribution of money from the gaming machine 110, the amount of unique interactions occurring with the gaming machine 110, an operating system status, and/or other operating characteristics that may be associated with the gaming machine 110.

One advantage of the present disclosure may be that the anti-tampering system 100 can be applied to a plurality of preexisting gaming machines 110*a*, 110*b*, . . . , 110*n* that are unrelated or a plurality of preexisting gaming machines 110*a*, 110*b*, . . . , 110*n* that are already associated with a conventional gaming machine network. The anti-tampering system 100, through the use of telematics, may provide an efficient way to monitor a plurality of gaming machines 110*a*, 110*b*, 110*n* via a secured network 302 that is separate from, or integrated into, any network linking the gaming machines 110 together.

Anti-tampering functions as described above are an illustrative advantage to various embodiments of a system and method as disclosed herein, but are not required in an embodiment unless otherwise specifically noted. One of skill in the art may appreciate that a telematics-equipped gaming network as disclosed herein may perform or otherwise enable various additional and/or alternative features.

Additional or alternative optional embodiments and aspects of a system and method as disclosed herein may relate to downstream implementation of telematics-based inputs from the respective gaming machines, for example at a hosted server network having responsibility for each of a plurality of distributed gaming machines. The gaming machines as elsewhere noted herein may provide real-time and/or programmatic signals via a communication network, for example a secured network having one or more dedicated interfaces between the hosted server and respective machines, wherein the hosted server is configured to perform one or more gaming network coordination features.

In one aspect, a gaming machine service route may be dynamically generated for a user based at least in part on the telematic inputs from the plurality of gaming machines. The service route may be generated to only include gaming machines having reported specified types of events, an accumulated amount of money over a threshold value, a rate of money accumulation in excess of a specified expected or target rate, or the like. The specified types of events may for example include a detected tampering event, including but not limited to change in position, change in orientation, unauthorized access, unconfirmed removal of funds, etc. Service routes may be generated based upon inputs from further sources, including for example historical data, user inputs, and the like, which may be used to model optimized routes based on volume of usage, route/traveling conditions, proximity, time, priority, etc.

In another aspect, an initial gaming machine service route for a user may be modified in substantially real time based on a current location of the user along the initial service route and further in view of updated states for one or more respective gaming machines in the distributed network. An updated state may for example correspond to reported events of specified types, an accumulated amount of money over a threshold value, a rate of money accumulation in excess of a specified expected or target rate, or the like. For example, the hosted server may be configured to prioritize servicing or other functions for gaming machines with respect to a hierarchical state analysis and further in view of a relative priority, proximity, capability, and the like as applied at least to the user.

In another aspect, respective initial gaming machine service routes for each of a plurality of users may be modified in substantially real time based on current locations of the various users along their respective initial service routes and further in view of updated states for one or more respective gaming machines in the distributed network. An updated state may for example correspond to reported events of specified types, an accumulated amount of money over a threshold value, a rate of money accumulation in excess of a specified expected or target rate, or the like. For example, the hosted server may be configured to prioritize servicing or other functions for gaming machines with respect to a hierarchical state analysis and further in view of relative priorities, proximities, capabilities, and the like as applied at least to each of the respective users.

In another aspect, respective gaming machine service routes for each of one or more users may be monitored in real time, at least in view of current locations and expected arrivals at respective gaming machines along the service routes. Certain event monitoring functions associated with a respective gaming machine may for example be selectively disabled via signals from the remote server, such that event-based alerts or the like are not falsely generated from the gaming machines based on expected maintenance functions, and then enabled after a period of time or selectively enabled based on an input corresponding to a change in position of the associated user, e.g., indicating that the user has left the location of the respective gaming machine.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. An anti-tampering system for use with a virtual gaming machine network, the system comprising:

a plurality of distributed gaming machines residing in respective physical locations and associated with respective unique identifiers, each gaming machine including one or more sensors configured to generate output signals corresponding to one or more of an input power, current position and/or current orientation of the respective gaming machine, a cellular modem, and a resident controller configured to conditionally generate an event based message in real time responsive to an event identified at least in part based on the output signals from the one or more sensors; and a remote processor associated with data storage and configured to:

independently interface with each resident controller via the respective cellular modem to define a secure wireless network comprising the plurality of distributed gaming machines, store in data storage for each of the plurality of distributed gaming machines an operating state and the respective unique identifier; and in response to receiving an event based message comprising an identifier, to identify the respective gaming machine by retrieving the associated unique identifier from the data storage, and conditionally generate an alert or response message based at least in part on a comparison of the event based message and the stored operating state for the respective gaming machine.

2. The anti-tampering system of claim 1, wherein:

each resident controller is configured to generate an operating characteristic based signal responsive to one or more identified operating characteristics.

3. The anti-tampering system of claim 2, wherein:

each resident controller is configured to store data related to the one or more identified operating characteristics and generate the operating characteristic based signal periodically.

4. The anti-tampering system of claim 2, wherein:

one of the one or more identified operating characteristics corresponds to the reception or distribution of money.

5. The anti-tampering system of claim 1, wherein:

the remote processor is configured to generate and transmit an identification request to a respective one of the plurality of gaming machines, the identification request corresponding to a request for the gaming machine to provide the associated unique identifier.

6. The anti-tampering system of claim 5, wherein:

the remote processor is configured to compare the unique identifier received from the respective one of the plurality of gaming machines to the stored unique identifier on the remote processor, and to generate an alert if the unique identifier received from the gaming machine does not match the stored unique identifier.

7. The anti-tampering system of claim 1, wherein:

the identified event corresponds to an inclination of the gaming machine relative to gravity in excess of a set value.

8. The anti-tampering system of claim 7, wherein:

the one or more sensors includes a gyroscope.

9. The anti-tampering system of claim 1, wherein:

the identified event corresponds to movement of the gaming machine in excess of a set value.

10. The anti-tampering system of claim 9, wherein:

the one or more sensors includes a global positioning system (GPS).

11. The anti-tampering system of claim 1, wherein:

the identified event corresponds to a loss of power to the gaming machine.

12. The anti-tampering system of claim 1 wherein:

the remote processor is configured to predict an event based signal from a respective one of the resident controllers when an authorized party interacts with the gaming machine and to temporarily disable the generation of event based signals from the resident controller.

13. A method of monitoring a distributed gaming machine network, the method comprising:

virtually defining a secure wireless network comprising a remote processor independently linked with each of a plurality of gaming machines residing in respective physical locations and associated with respective unique identifiers, each gaming machine including a cellular modem functionally linked to the wireless network;

at each of the plurality of gaming machines, generating output signals corresponding to one or more of an input power, current position and/or current orientation of the respective gaming machine, and further generating event based messages in real time responsive to an event identified at least in part based on the output signals; and in response to receiving an event based message comprising an identifier at the remote processor, identifying the respective gaming machine by retrieving the associated unique identifier from data storage, and conditionally generating an alert or response message based at least in part on a comparison of the event based message and a stored operating state for the respective gaming machine.

14. The method of claim 13, further comprising:

generating an operating characteristic based signal responsive to one or more identified operating characteristics of the gaming machine via the one or more sensors and resident controller of a respective gaming machine.

15. The method of claim 14, further comprising:

storing data related to the one or more identified operating characteristics on each resident controller; and periodically generating the operating characteristic based signal via the resident controller.

16. The method of claim 14, wherein:

one of the one or more identified operating characteristics corresponds to the reception or distribution of money.

17. The method of claim 13, further comprising:

generating and transmitting an identification request to a respective one of the plurality of gaming machines, the identification request corresponding to a request for the gaming machine to provide an associated unique identifier;

comparing the unique identifier received from the gaming machine to a stored unique identifier of the remote processor; and generating an alert via the remote processor if the unique identifier received does not match the stored unique identifier.

18. The method of claim 13, wherein:

the identified event corresponds to an inclination of the gaming machine relative to gravity in excess of a set value.

19. The method of claim 13, wherein:

the identified event corresponds to movement of the gaming machine in excess of a set value.

20. The method of claim 13, wherein:

the identified event corresponds to a loss of power to the gaming machine.

* * * * *